US009502185B2

(12) United States Patent
Chevalier et al.

(10) Patent No.: US 9,502,185 B2
(45) Date of Patent: Nov. 22, 2016

(54) NEGATIVE ELECTRODE FOR ASYMMETRIC SUPERCAPACITOR HAVING A POSITIVE ELECTRODE BASED ON NICKEL HYDROXIDE AND AN ALKALINE ELECTROLYTE AND METHOD FOR MAKING SAME

(75) Inventors: Stéphanie Chevalier, Bordeaux (FR); Mélanie Dendary, Eysines (FR); Philippe Desprez, Bordeaux (FR)

(73) Assignee: SAFT, Bagnolet (FR)

( * ) Notice: Subject to any disclaimer, the term of this patent is extended or adjusted under 35 U.S.C. 154(b) by 367 days.

(21) Appl. No.: 13/481,005

(22) Filed: May 25, 2012

(65) Prior Publication Data
US 2012/0300367 A1 Nov. 29, 2012

(30) Foreign Application Priority Data
May 27, 2011 (FR) .................... 11 54681

(51) Int. Cl.
| H01G 9/00 | (2006.01) |
| H01M 2/16 | (2006.01) |
| H01M 2/18 | (2006.01) |
| H01M 4/13 | (2010.01) |
| H01M 6/48 | (2006.01) |
| H01M 10/18 | (2006.01) |
| H01G 11/28 | (2013.01) |
| H01G 11/50 | (2013.01) |
| H01M 10/18 | (2006.01) |
| H01G 11/28 | (2013.01) |
| H01G 11/50 | (2013.01) |

(52) U.S. Cl.
CPC .............. *H01G 11/28* (2013.01); *H01G 11/50* (2013.01); *Y02E 60/13* (2013.01); *Y10T 29/49* (2015.01)

(58) Field of Classification Search
CPC ...... H01G 9/155; H01G 9/058; Y02E 60/13; Y02E 60/12; Y02E 60/122
USPC .................. 361/502; 429/137, 210
See application file for complete search history.

(56) References Cited

U.S. PATENT DOCUMENTS

2006/0068296 A1 3/2006 Nakagawa et al.
2007/0212604 A1* 9/2007 Ovshinsky et al. .......... 429/210

(Continued)

FOREIGN PATENT DOCUMENTS

| EP | 0 750 358 A2 | 12/1996 |
| EP | 1 447 867 A2 | 8/2004 |
| EP | 2093191 A1 | 8/2009 |
| JP | 2007-66836 A | 3/2007 |

OTHER PUBLICATIONS

P.P. Bhattacharjee et al., "Effect of Sintering Temperature on Grain Boundary Character Distribution in Pure Nickel", Scripta Materialia, 2007, pp. 13-16, vol. 56.

(Continued)

*Primary Examiner* — Eric Thomas
*Assistant Examiner* — Arun Ramaswamy
(74) *Attorney, Agent, or Firm* — Sughrue Mion, PLLC (57) ABSTRACT

The object of the invention is an electrode comprising a continuous current collector (1) wherein 50% or more of the surface of said collector has a roughness Ra1 comprised between 0.8 and 15 μm, measured for a base length comprised between 2 and 200 μm, said collector being coated with a mixture (2) comprising active carbon having a specific surface area greater than or equal to 500 m²/g and a binder comprising a mixture of at least one cellulosic compound and at least one styrenic copolymer. The object of the invention is also an asymmetric supercapacitor comprising at least one electrode according to the invention. The invention also relates to a method for making a carbon electrode for an asymmetric supercapacitor.

16 Claims, 9 Drawing Sheets

(56) References Cited

U.S. PATENT DOCUMENTS

| | | |
|---|---|---|
| 2008/0003503 A1* | 1/2008 | Kawakami et al. ........ 429/231.5 |
| 2009/0176158 A1* | 7/2009 | Ugaji et al. .................... 429/220 |
| 2009/0208839 A1 | 8/2009 | Geng et al. |
| 2009/0286155 A1* | 11/2009 | Takehara ...................... 429/199 |
| 2009/0290287 A1* | 11/2009 | Lipka ..................... H01G 11/46 361/502 |
| 2011/0014508 A1 | 1/2011 | Okawa et al. |
| 2011/0045350 A1* | 2/2011 | Amos .................... C01G 45/02 429/219 |

OTHER PUBLICATIONS

Steven Tomovich et al., "Quantitative Surface Characterisation Using Laser Scanning Confocal Microscopy", Laser Scanning, Theory and Applications, pp. 1-30.

French Search Report for 1154681 dated Dec. 23, 2011.
European Search Report; EP 12 16 7763; Apr. 15, 2013.

* cited by examiner

| Classification | Appearance of the cross-cut area in which flaking occurred (Example of six parallel cuts) |
|---|---|
| 0 | — |
| 1 |  |
| 2 |  |
| 3 |  |
| 4 |  |
| 5 | — |

Fig. 5c

| | ISO 2409 classification | Appearance of electrode after cross-cut adhesion test |
|---|---|---|
| So-called smooth collector $Ra1 = 0.73\ \mu m$ $Ra2 = 0.11\ \mu m$ | 5 |  |
| Collector with roughness according to the invention $Ra1 = 2.34\ \mu m$ $Ra2 = 0.21\ \mu m$ | 1 |  |
| Collector with intermediate roughness $Ra1 = 1.23\ \mu m$ $Ra2 = 0.10\ \mu m$ | 3 |  |

NEGATIVE ELECTRODE FOR ASYMMETRIC SUPERCAPACITOR HAVING A POSITIVE ELECTRODE BASED ON NICKEL HYDROXIDE AND AN ALKALINE ELECTROLYTE AND METHOD FOR MAKING SAME

FIELD OF THE INVENTION

The technical field of the invention is that of asymmetric supercapacitors with an alkaline electrolyte having one positive electrode based on nickel hydroxide and one negative electrode based on carbon coated on a current collector.

STATE OF THE ART

The energy storage system called "supercapacitor", also known as "supercapacitance", or "electrochemical double-layer condenser" and designated as "Electric Double Layer Capacitor (EDLC)", or additionally as "ultracapacitance" and "ultracapacitor", is a device allowing energy storage by means of ion accumulation on two electrodes serving as ion collectors when a potential difference is applied between them. The term "supercapacitor" will be used throughout the remainder of this document and it is obvious that this vocabulary also designates the equivalent terminologies mentioned above. An electrochemical supercapacitor comprises at least one positive electrode and at least one negative electrode. Both electrodes are separated from one another by one separator. The electrochemical bundle formed by the assembly of the positive and negative electrodes and the separators is impregnated with an electrolyte. In general, active carbon possessing a large specific surface area (greater than 500 $m^2/g$) is coated on the surface of the electrodes, thereby enabling attainment of very high capacitance values. A supercapacitor is able to provide an energy density from 4 to 6 Wh/kg, which is approximately 40 to 60 times greater than that of an electrolytic capacitor. There are different alternatives of electrochemical supercapacitors.

A first alternative was that of the symmetric supercapacitors with an aqueous electrolyte. In this type of supercapacitor, the positive electrode and the negative electrode consist of similar materials having the same capacitance. Most often, active carbon is used. Patent application EP-A-1 883 937 describes the manufacturing of an electrode based on active carbon which may be used in the design of symmetric supercapacitors with an aqueous electrolyte.

A second alternative is that of symmetric supercapacitors with a non-aqueous electrolyte. As described in U.S. Pat. No. 6,356,432, the supercapacitor comprises a non-aqueous electrolyte, such as acetonitrile, and two carbon electrodes, each electrode comprising a binder and an electrochemically active material consisting of active carbon having a specific surface area greater than 2,000 $m^2/g$.

The third alternative of a supercapacitor is that of asymmetric supercapacitors also designated as hybrid supercapacitors, with an aqueous electrolyte. Patent application EP-A-1 156 500 describes the general operating principle of this type of supercapacitor. One such supercapacitor comprises one negative electrode based on active carbon and one positive electrode whose active material may be reversibly oxidized. The positive electrode is charged by a Faradic process while the negative electrode is charged by ion accumulation at the electrode/electrolyte interface forming a double layer. The charge accumulation occurring at the negative electrode corresponds to a non-Faradic process.

Document WO 2008/067337 describes a composition for an electrode which may be used in the design of electrochemical double-layer supercapacitors in which the positive or negative electrode is based on carbon doped with type p or n donors.

U.S. Pat. No. 7,576,971 describes an asymmetric supercapacitor comprising one positive electrode preferentially based on manganese dioxide and one negative electrode comprising a mixture of active carbon and a binder based on polytetrafluoroethylene (PTFE).

U.S. Pat. No. 6,252,762 describes a hybrid battery/supercapacitor system comprising a positive electrode based on active carbon and a negative electrode based on a $Li_4Ti_5O_{12}$ type spinel compound.

Patent RU 2 296 383 describes asymmetric supercapacitors having one positive electrode based on nickel hydroxide and one negative electrode based on active carbon on an iron or copper current collector.

U.S. Pat. No. 5,986,876 concerns asymmetric supercapacitors in which the positive electrode is based on nickel hydroxide and the negative electrode is composed of a material based on carbon felt.

Figure 1A:
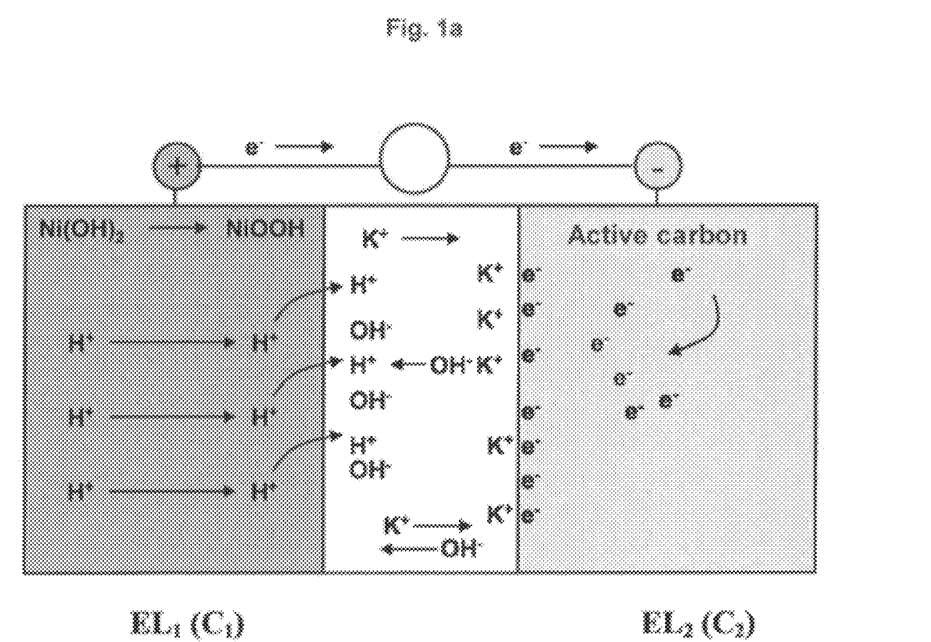
FIGS. 1a and 1b are schematic illustrations of ion movement when operating an asymmetric supercapacitor with a positive electrode based on nickel hydroxide and an alkaline electrolyte, respectively, during charging and also during discharging.
Figure 1B:
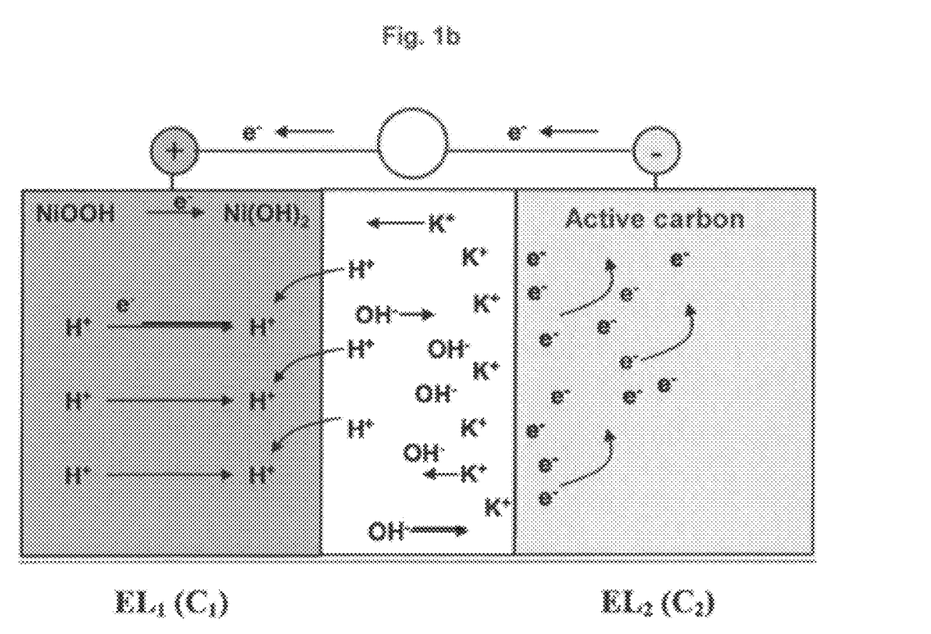
Figure 2:
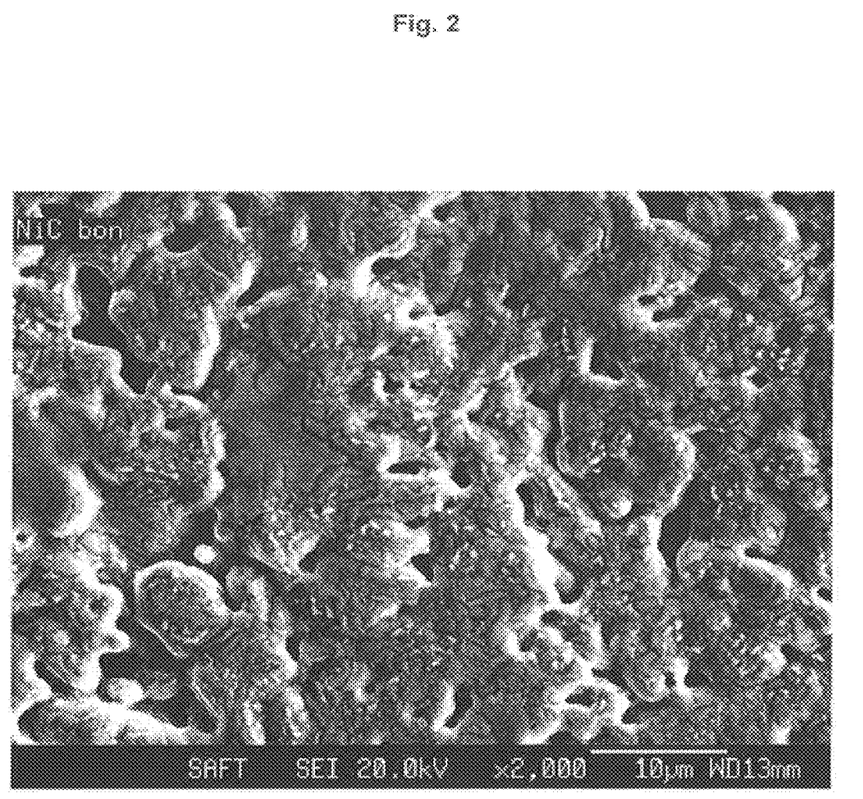
FIG. 2 is a photograph of the electrode according to the invention taken with a scanning electron microscope.

The present invention relates more specifically, but not exclusively, to this third alternative of supercapacitors whose operating principle is schematically illustrated in FIGS. 1$a$ and 1$b$. These figures are the schematization of an example of an asymmetric supercapacitor in which the positive electrode $EL_1$ having capacitance $C_1$ is an electrode based on a nickel-based hydroxide and the negative electrode $EL_2$ having capacitance $C_2$ is an electrode based on active carbon. The positive electrochemically active material is a nickel-based hydroxide. By the term "nickel-based hydroxide" is meant a nickel hydroxide, a hydroxide mainly containing nickel, but also a nickel hydroxide containing at least one syncrystallized hydroxide of an element selected from, for example, zinc (Zn), cadmium (Cd), magnesium (Mg) and aluminium (Al), and at least one syncrystallized hydroxide of an element selected from cobalt (Co), manganese (Mn), aluminium (Al), yttrium (Y), calcium (Ca), zirconium (Zr) or copper (Cu). A syncrystallized hydroxide contained in the nickel hydroxide is a hydroxide forming a solid solution with nickel hydroxide, i.e. occupying, in continuously variable proportion, the atomic sites defined by the crystal lattice of the nickel hydroxide.

The positive and negative electrodes are separated from one another by a separator that is a porous membrane impregnated with alkaline electrolyte, such as KOH and/or NaOH and/or LiOH. The capacitance $C_1$ of the positive electrode is proportional to the amount of nickel-based hydroxide. The capacitance $C_2$ of the negative electrode results from the formation of an electrostatic double layer at the active carbon/electrolyte interface. This double layer is on the one hand made up by accumulation of electrolyte $K^+$ ions adsorbed at the active carbon surface and also on the other hand made up by accumulation of electrons $e^-$ in the active carbon compensating for the positive electrostatic charge created by adsorption of $K^+$ ions. The capacitance $C_2$ is proportional to the specific surface area of the active carbon. The movement of electrolyte $K^+$ and $OH^-$ ions is illustrated during charging (FIG. 1$a$) and during discharging (FIG. 1$b$).

An asymmetric supercapacitor has several advantages as compared to a symmetric supercapacitor.

On the one hand, it has greater capacitance. Indeed, let $C_T$ be the capacitance of a supercapacitor, one has the following relationship: $1/C_T=1/C_1+1/C_2$. In the case of a symmetric supercapacitor $C_1=C_2$ whence $C_T=C_1/2=C_2/2$. The capacitance of an asymmetric supercapacitor is thus equal to half the capacitance of one of the electrodes. In the case of an asymmetric supercapacitor, the capacitance $C_1$ of the nickel-based hydroxide electrode is considerably greater than the capacitance $C_2$ of the active carbon-based electrode; whence the relationship $C_1 \gg C_2$ and $C_T = (C_1 \times C_2)/(C_1+C_2) \approx (C_1 \times C_2)/C_1 \approx C_2$. The capacitance of an asymmetric supercapacitor is therefore approximately equal to the smallest capacitance $C_2$, i.e. a gain in capacitance by a factor 2 as compared with a symmetric supercapacitor.

On the other hand, an aqueous electrolyte asymmetric supercapacitor may supply a voltage of the order of 1.7 to 1.8V while a symmetric supercapacitor can generally supply a voltage of less than 0.9V, thus an energy gain as compared with symmetric supercapacitors.

A drawback of the state-of-the-art asymmetric supercapacitors is that their assembly requires the use of woven active carbon material, such as a carbon felt or woven carbon fibres. The woven active carbon material is wound around the current collector of the negative electrode. Assembly of the asymmetric supercapacitor is complicated due to the necessity of manipulating and stacking three pieces: one positive electrode, one current collector and one woven carbon fabric, the latter having to be wound around the current collector.

Another drawback of state-of-the-art asymmetric supercapacitors results from usage of PTFE as the negative electrode binder. The carbon-based active materials used in the state of the art are mixed with polytetrafluoroethylene (PTFE). However, PTFE mixed with the carbon-based active materials gives a mixture having the appearance of a latex that does not exhibit good mechanical bonding to the current collector. A loss of conductivity is observed between the current collector and the mixture resulting in a capacitance drop during supercapacitor operation.

The object of the invention is to provide an asymmetric supercapacitor which is easier to manufacture due to the absence of woven carbon fabric or carbon felt.

SUMMARY OF THE INVENTION

The object of the invention is a supercapacitor electrode comprising a continuous current collector wherein 50% or more of the surface area of said collector exhibits a roughness Ra1 comprised between 0.8 and 15 µm, measured for a base length comprised between 2 and 200 µm, said collector being coated with a mixture comprising:

a) active carbon having a specific surface area greater than or equal to 500 $m^2/g$;

b) a binder comprising a mixture of at least one cellulosic compound and at least one styrenic copolymer.

By "current collector" is meant an electron-conducting metal foil.

The continuous current collector exhibits a roughness Ra1 comprised between 0.8 and 15 µm over 50% or more of its surface area so as to promote adhesion of the mixture to the entire surface area of the collector.

By "coated" is meant covering the essential of the collector's surface area.

Roughness is measured on cross-sections of a current collector and corresponds to the arithmetic mean of the absolute values of the ordinate y, between each point on the curve, and the Ox axis.

According to one embodiment of the invention, roughness Ra1 is comprised between 1 and 5 µm, preferably between 1.2 and 3 µm.

Preferably, the current collector also exhibits on at least 50% of its surface area a roughness Ra2 comprised between 0.1 and 0.5 µm, measured for a base length which is greater than or equal to 0.1 µm and strictly less than 2 µm.

According to one embodiment of the invention, 75% or more, preferably 90% or more, still preferably 95% or more, of the surface area of the current collector exhibits a roughness Ra1 comprised between 0.8 and 15 µm.

Preferably, the active carbon exhibits a specific surface area greater than or equal to 1,000 $m^2/g$, more preferentially greater than or equal to 1,400 $m^2/g$.

According to one embodiment of the invention, the mixture also comprises a carbonaceous compound other than active carbon, selected from the group comprising carbon black, glassy carbon, petroleum pitch and graphite.

Preferably, the material of the continuous current collector is selected from nickel or a nickel-based alloy, copper or a copper-based alloy, aluminium or an aluminium-based alloy, stainless steel and nickel-plated steel, preferably nickel or a nickel-based alloy.

In a preferred embodiment of the invention, the binder essentially consists of a mixture of at least one cellulosic compound and at least one styrenic copolymer.

According to a preferred embodiment, the cellulosic compound is selected from the group comprising hydroxy-propyl-methylcellulose (HPMC), carboxymethylcellulose (CMC), hydroxypropylcellulose (HPC) and hydroxyethyl cellulose (HEC).

According to a preferred embodiment, the styrenic copolymer is a styrenic block copolymer selected from the group comprising styrene-butadiene rubber (SBR), styrene-isoprene (SI), styrene-ethylene/butylene (SEB), styrene-isoprene/butylene (SIB), styrene-ethylene/propylene (SEP), styrene-butadiene-styrene (SBS), styrene-isoprene-styrene (SIS), styrene-ethylene/butylene-styrene (SEBS), styrene-isoprene/butylene styrene (SIBS) and styrene-ethylene/propylene-styrene (SEPS).

According to a preferred embodiment, the styrenic copolymer is polystyrene acrylate (PSA).

Preferably, the binder does not contain any polytetrafluoroethylene (PTFE).

According to a preferred embodiment, the styrenic block copolymer is styrene-butadiene rubber (SBR) and the cellulosic compound is hydroxyl-propyl-methylcellulose (HPMC).

According to a preferred embodiment of the invention, the mixture comprises from 60 to 93% by weight of active carbon, from 5 to 20% by weight of carbon black, from 1 to 10% by weight of cellulosic compound and from 1 to 10% by weight of styrenic copolymer.

According to a preferred embodiment, a tack coating comprising carbon is present between the current collector and the mixture.

The object of the invention is also an asymmetric supercapacitor comprising:

a) at least one positive electrode comprising a nickel-based hydroxide and a nickel-based current collector;

b) at least one negative electrode according to the invention;

c) an alkaline electrolyte;

d) at least one separator.

According to an embodiment of the invention, the separator comprises a non-woven polypropylene material and optionally a polyethylene membrane grafted with acrylic acid groups.

The object of the invention is also a method for manufacturing an electrode comprising the following steps:

a) providing a continuous current collector which exhibits on at least 50% of its surface area a roughness comprised between 0.8 and 15 μm, measured for a base length comprised between 2 μm and 200 μm.

b) mixing active carbon having a specific surface area greater than or equal to 500 m²/g with:
 a binder comprising a mixture of at least one cellulosic compound and at least one styrenic copolymer and water until a paste is obtained;

c) depositing the paste obtained at step b) onto the current collector of step a);

d) compressing or calendering the paste-coated current collector to form an electrode;

e) drying the electrode obtained at step d).

According to an embodiment of the invention, with the manufacturing method, it is possible to obtain the electrode according to the invention.

The current collector of the negative electrode according to the invention exhibits particular roughness Ra, whereby an electrode exhibiting enhanced properties may be obtained:

Indeed, there is an unexpected interplay between the particular roughness and the choice of the mixture. By selecting roughness Ra in a specific range associated with the specific choice of a binder of the active material, it is possible to have good adhesion of the active material to the current collector. Said good adhesion provides improved operational life time of the electrode and a supercapacitor having improved capacitance may be obtained.

One advantage of the invention is to provide an asymmetric supercapacitor exhibiting capacitance greater than or equal to that of an asymmetric supercapacitor whose negative electrode comprises a smooth or perforated current collector.

Another advantage of the invention is to provide an asymmetric supercapacitor exhibiting capacitance greater than or equal to that of an asymmetric supercapacitor whose negative electrode comprises PTFE as a binder mixed with the active material.

In the electrode of the invention, the current collector is coated with a mixture according to the invention whereby resorting to the use of PTFE and carbon felt may be avoided. With the asymmetric supercapacitors of the invention it is possible to attain good voluminal and mass capacitance, i.e. greater than 70 F/g and greater than 45 F/cm³ respectively. The method for manufacturing the asymmetric supercapacitor of the invention is simplified in comparison with that of a supercapacitor comprising a negative electrode in which the woven active carbon material is a part by itself which must be wound in an accordion fashion around the current collector. The assembly of the electrochemical system of the invention is simplified since it is a conventional stack of plates.

Moreover, in the invention, the cost of the active material of the negative electrode is reduced since a woven active carbon fabric as used in the prior art is much more expensive than active carbon powder. Indeed, woven active carbon fabric costs approximately 210 USD/kg, i.e., approximately 21 USD per 10,000 F supercapacitor supplying 1.3V, whereas active carbon powder only costs 16 to 60 USD/kg, i.e., 1.6 to 6 USD per supercapacitor.

Other features and advantages of the invention will become apparent, upon reading the following description of a preferred embodiment of the invention, given as an example and with reference to the appended drawings.

BRIEF DESCRIPTION OF THE DRAWINGS

FIG. 3 is a diagram defining the roughness parameter Ra. Roughness Ra is measured by uniformly distributing the upper and lower areas surrounding the mean line m on a base length. Roughness Ra is equal to the height of the obtained strip. The following relationship is then verified:

Σ of valley areas=Σ of peak areas=½$Ra$×base length

FIGS. 5a, 5b and 5c illustrate the principle and results of the adhesion test or cross-cut adhesion test performed on various nickel-based current collectors 1 and coated with the mixture 2 according to the invention. FIG. 5c shows the results of said adhesion test, with an image of the electrode surface after the test as well as the classification according to standard NF EN ISO 2409 of various current collectors. The classification according to standard NF EN ISO 2409 is additionally described in the following Table 1:

TABLE 1

Description of classification according to standard NF EN ISO 2409

| Classification | Description |
|---|---|
| 0 | The edges of the cuts are completely smooth, none of the squares of the grid pattern is detached. |
| 1 | At the intersections of the grid lines, small flakes of the coating are detached. Less than 5% of the squared area is affected. |
| 2 | The coating is flaked off along the edges and/or at the intersections of the cuts. The squared area is affected over more than 5% but over less than 15%. |
| 3 | The coating is flaked off along the edges of the cuts partly or entirely in broad strips and/or is flaked off partly or entirely in various locations of the grid patterns. A squared area of more than 15% but less than 35% is affected. |
| 4 | The coating is flaked off along the edges of the cuts in broad strips and/or a few squares have been detached partly or entirely. A squared area of more than 35% but less than 65% is affected. |
| 5 | All the degrees of flaking which cannot be classified according to classification 4. |

Curves 61 and 71 were obtained for an electrode having a coating with HPMC and SBR on a current collector according to the invention and exhibiting high roughness (Ra1=2.34 μm). Curves 62 and 72 were obtained from an electrode having a coating with HPMC and SBR on a so-called smooth current collector. Curves 63 and 73 were obtained from an electrode having a coating with HPMC and SBR on a current collector according to the invention and exhibiting lower roughness (Ra1=1.23 μm). Curves 64 and 74 were obtained from an electrode with a PTFE-based coating on a current collector according to the invention and exhibiting high roughness (Ra1=2.34 μm).

DISCUSSION OF THE EMBODIMENTS OF THE INVENTION

According to the invention, asymmetric supercapacitors comprise at least one positive electrode comprising an active material mainly consisting of nickel-based hydroxide, at least one negative electrode comprising a mixture of a carbon-based active material and binder, an alkaline electrolyte and at least one separator.

The positive electrode comprises a current collector and an active material mainly consisting of nickel-based hydroxide.

The positive electrochemically active material is a nickel-based hydroxide. By "nickel-based hydroxide" is meant a nickel hydroxide, a hydroxide mainly containing nickel, but also a nickel hydroxide containing at least one syncrystallized hydroxide of an element chosen from zinc (Zn), cadmium (Cd), magnesium (Mg) and aluminium (Al), and at least one syncrystallized hydroxide of a particular element selected from cobalt (Co), manganese (Mn), aluminium (Al), yttrium (Y), calcium (Ca), zirconium (Zr) or copper (Cu). One syncrystallized hydroxide contained in the nickel hydroxide is a hydroxide forming a solid solution with nickel hydroxide, i.e. occupying, in continuously variable proportion, the atomic sites defined by the crystal lattice of the nickel hydroxide.

The current collector of said positive electrode is in nickel, for example, sintered nickel adapted for power applications, i.e. that the discharge current may exceed 500 A for a supercapacitor unit.

Figure 3:
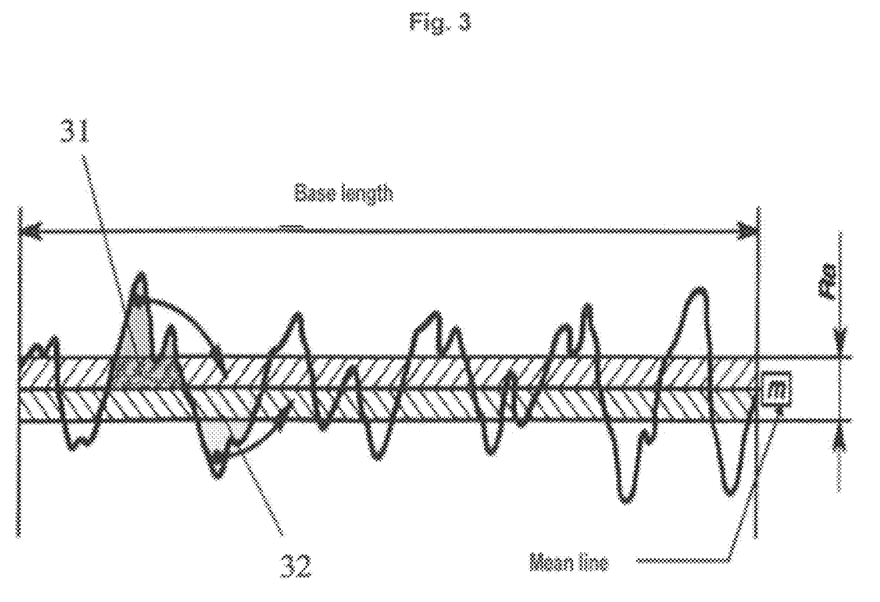

The negative electrode comprises a current collector and a carbon-based active material. The surface of the current collector is continuous, i.e. it does not include any perforations. The current collector is selected from the following metals: nickel or a nickel-based alloy, copper or a copper-based alloy, aluminium or an aluminium-based alloy, stainless steel, nickel steel. It exhibits on 50% or more of its surface area a primary roughness Ra1 comprised between 0.8 and 15 μm and preferably a secondary roughness Ra2 comprised between 0.1 and 0.5 μm on 50% or more of its surface area. Preferably the primary roughness is comprised between 1 and 5 μm, preferably between 1.2 and 3 μm. Roughness is measured with a scanning confocal microscope of the LASERTEC brand. The method for obtaining the image is known to one skilled in the art. Tomovich, Peng, Yuan and Yan have published a chapter "*Quantitative Surface Characterisation Using Laser Scanning Confocal Microscopy*" in the textbook "Laser Scanning, Theory and Applications" edited by Chau-Chang Wang, describing the principle of the scanning confocal microscope, notably with its utility for characterisation of surfaces. The surface is scanned by a laser ray concentrated by a lens. A variable diaphragm or pinhole is placed in front of the detector in the focal plane in conjunction with the focal plane of the objective. Thus, only the photons coming from the focal plane pass through the pinhole and participate in the formation of the image. A succession of scans is acquired while varying the focal plane thereby enabling recording of the surface in the three spatial dimensions. As shown in FIG. 3, the roughness is measured by uniformly distributing the upper and lower areas surrounding the mean line m. Roughness Ra is equal to the height of the obtained strip. Indeed, the following relationship is then verified:

$$\Sigma \text{ of valley areas}(32) = \Sigma \text{ of peak areas}(31) = \frac{1}{2} Ra \times \text{base length}$$

With regard to the above relationship, the roughness value Ra is independent of base length. Primary and secondary roughnesses define two scales of measurement of roughness. Indeed, primary roughness Ra1 is defined for a base length comprised between 2 and 200 μm, whereas secondary roughness Ra2 (or "micro-roughness") is defined for a base length greater than or equal to 0.1 μm and strictly less than 2 μm, preferably from 0.1 to 1.5 μm, and still preferably from 0.1 to 1 μm.

Primary roughness Ra1 as defined in the invention may be measured according to standard ISO 4287. In the ISO 4287 standard, the base length is designated as "mean width of the profile elements" and is noted as Rsm.

Specific roughness of the current collector will have the effect of enhancing adhesion of the active material onto said collector. Good adhesion of the active material onto the current collector ensures a long operational life time and good performances, i.e. good capacitance, of the electrode. The current collector may be obtained by means of a powder (of nickel, for example) sintering process at a temperature between 800° C. and 1,300° C. as described by P. P. Bhattacharjee et al. in *Scripta Materialia* 56 (2007), 13-16. Control of the sintering temperature enables adjustment of the primary roughness Ra1 value. Indeed, primary roughness Ra1 decreases as the sintering temperature increases. In the examples according to the invention of Table 2, the current collector having a roughness profile of 2.34 μm, is obtained from a nickel powder with a diameter $D_{50}$ between 10-20 μm by sintering at a temperature between 800° C. and 1000° C. and the current collector having a roughness profile of 1.23 μm, is obtained from a nickel powder having a diameter $D_{50}$ of 10-20 μm by sintering at a temperature between 1,100° C. and 1,300° C.

The active material of the negative electrode comprises active carbon having a specific surface area greater than or equal to 500 $m^2/g$, preferably greater than or equal to 1,000 $m^2/g$, preferentially greater than or equal to 1,400 $m^2/g$.

The specific surface area (also called "developed surface area") is measured by the BET method via nitrogen adsorption by the active carbon sample at a defined temperature, in this case the temperature of liquid nitrogen, −196° C. The specific surface area of a powder is measured as follows: A powder sample is taken, the mass of which is comprised between 0.1 and 1 g. To ensure good measurement accuracy, it is necessary to have a specific surface area of at least approximately 1 $m^2/g$. A 10 $cm^3$ cell is used. The entire measuring cell is weighed. The sample is added to the cell. The entire sample/cell unit is weighed. The measuring cell is placed in the de-gassing station for 12 hours at 120° C. The cell is rapidly sealed with a plug after de-gassing. The entire sample/cell unit is weighed after it has returned to room temperature and the result is noted down. All weighings are carried out without the plug. The mass of the sample is obtained by subtracting the mass of the cell from the mass of the cell+de-gassed sample.

Analysis of the sample is then performed using a Belsorp Mini analyzer manufactured by Bel Japan Inc. The measurement is based on the sample's nitrogen adsorption at a given temperature, in this case the temperature of liquid nitrogen, i.e. −196° C. The apparatus measures the pressure of the reference cell in which the adsorbate is at its saturation vapour pressure and that of the sample cell in which the known volumes of adsorbate are injected. The curve resulting from these measurements is the adsorption isotherm. In the measurement process, it is necessary to know the hold-up volume of the cell: therefore this volume is measured using helium before the analysis.

The mass of the sample calculated previously is entered as a parameter. The BET surface is determined by the software via linear regression from the experimental curve. The standard deviation of the reproducibility obtained from 5 measurements performed on a powder having a specific surface area of 65 m$^2$/g is 2.5. Twice a year, a verification is performed with a reference powder, here, an alumina reference material 16822 from Micrometrics.

Preferably, the active material also comprises a carbonaceous compound other than active carbon, selected from carbon black, glassy carbon, graphite and petroleum pitch. The active material is mixed with a binder. On the one hand, said binder imparts to the active material, adherence to the current collector and, on the other hand, said binder imparts flexibility to the electrode. The binder comprises at least one cellulosic compound and at least one styrenic copolymer. Preferably the cellulosic compound is selected from the group comprising hydroxy-propyl-methylcellulose (HPMC), carboxymethylcellulose (CMC), hydroxypropylcellulose (HPC) and hydroxyethyl cellulose (HEC). The styrenic copolymer is preferably a styrene block copolymer selected from the group comprising styrene-butadiene rubber (SBR), styrene-isoprene (SI), styrene-ethylene/butylene (SEB), styrene-isoprene/butylene (SIB), styrene-ethylene/propylene (SEP), styrene-butadiene-styrene (SBS), styrene-isoprene-styrene (SIS), styrene-ethylene/butylene-styrene (SEBS), styrene-isoprene/butylene styrene (SIBS) and styrene-ethylene/propylene-styrene (SEPS). Preferably, the polymeric binder comprises hydroxy-propyl-methylcellulose (HPMC) and styrene-butadiene rubber (SBR) or polystyrene acrylate (PSA). In a preferred embodiment of the invention, the binder exclusively consists of at least one cellulosic compound and at least one styrenic copolymer.

Preferably, active carbon accounts for 60 to 93% by weight of the mixture of active material and binder, carbon black accounts for 5 to 20% by weight of the mixture of active material and binder, HPMC accounts for 1 to 10% by weight of the mixture of active material and binder and SBR accounts for 1 to 10% by weight of the mixture of active material and binder.

Preferably, the current collector is covered with a first tack coating comprising carbon. Said tack coating is present between the current collector and the mixture and may be made by methods known to one skilled in the art, for example, by ink coating, by a gaseous phase deposition process, by pyrolysis of a carbonaceous polymer or by plasma deposition. Said tack coating ensures improved adhesion of the paste onto the current collector.

The capacitance of the negative electrode is generally to a large extent in excess, as compared with the positive electrode which is only used between 5 and 20%. In addition, the potential of the positive electrode is relatively constant as a function of its charge state, this corresponds to a very high capacitive term (in farads) of the positive electrode. As a result, the capacitance of the asymmetric supercapacitor is approximately equal to that of the negative electrode.

Adhesion of the active material to the current collector is likewise ensured by the primary roughness profile Ra1 and the secondary roughness profile Ra2 of the current collector associated with the carbon and polymeric binder mixture.

This mixture, having the consistency of a paste and not that of a latex, exhibits very good mechanical strength once coated onto the current collector. As shown in FIG. 5c, said paste adheres very well to the current collector, thereby ensuring good conductivity.

The electrolyte of the supercapacitor is selected in such a way that it is adapted to the compositions of the electrodes. The electrolyte of the invention is an alkaline electrolyte, such as potassium hydroxide (KOH) and/or lithium hydroxide (LiOH) and/or sodium hydroxide (NaOH), at a concentration greater than 6N in order to guarantee strong ion conductivity. Preferably, the alkaline electrolyte is potassium hydroxide (KOH).

The separator used in the invention is the one which is commonly used in Ni—Cd battery systems. The separator may comprise a non-woven polypropylene material (FTR108, Freudenberg) and optionally a membrane comprising polyethylene grafted with acrylic acid groups (C6, Shanghai Shi Long Hi-Tech).

The method for manufacturing the electrode of the invention comprises the following steps. First of all, the current collector having a primary roughness profile Ra1 comprised between 0.8 and 15 μm is provided.

In a first step, the active material based on active carbon having a specific surface area greater than or equal to 500 m$^2$/g is provided. The binder is added to the active material in the presence of water until the formation of a paste. In a second step, the paste is coated onto the current collector. In a third step, the paste-coated current collector is compressed or calendered in order to obtain the electrode. A last step consists of drying the thereby manufactured electrode.

The asymmetric supercapacitor is assembled by conventionally stacking various electrodes and separators. One separator is interposed between one positive electrode and one negative electrode. Said three elements are placed in one container. The electrolyte is introduced into the container either before or after placing the electrodes and separators in the container. The positive electrodes are connected to each other and form the positive current output terminal of the supercapacitor and the negative electrodes are connected to each other and form the negative current output terminal of the supercapacitor. The container is sealed by means of a lid. In general, the lid supports the current terminals.

The supercapacitor of the invention may be utilised in various industrial applications, in the field of railways and in that of energy storage markets.

EXAMPLES

Figure 4:
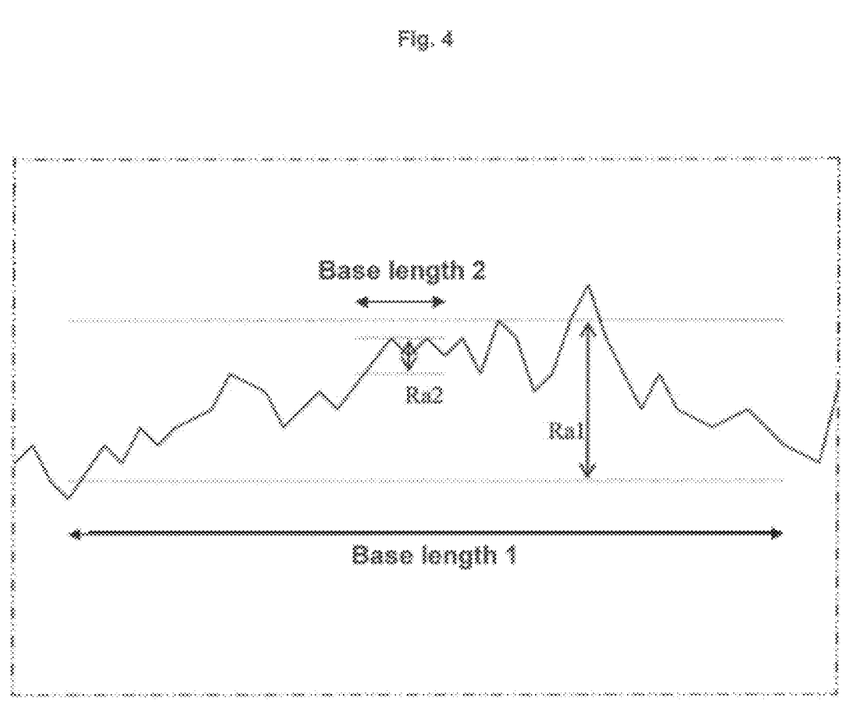
FIG. 4 is a schematic illustration of the surface area of a current collector, wherein measurements of primary roughness Ra1 and secondary roughness Ra2 are illustrated. Primary roughness is defined and measured for a base length comprised between 2 and 200 μm. Secondary roughness is defined and measured for a base length greater than or equal to 0.1 μm and strictly less than 2 μm, preferably from 0.1 to 1.5 μm, and still preferably from 0.1 to 1 μm.

Three current collectors are provided, a first so-called smooth current collector and two current collectors according to the invention of different roughnesses. The current collector is said to be smooth if its primary roughness Ra1 is less than 0.8 μm. Primary roughness Ra1 and secondary roughness Ra2 have been measured with a scanning confocal microscope. The measurement method is illustrated by the diagram of FIG. 4. The results of the obtained roughness measurements are shown in Table 2.

TABLE 2

| Primary and secondary roughness measurements | | |
|---|---|---|
| Type of nickel-based collector | Primary roughness Ra1 (μm) | Secondary roughness Ra2 (μm) |
| So-called smooth collector | 0.73 | 0.11 |
| Collector according to the invention (high roughness) | 2.34 | 0.21 |

TABLE 2-continued

Primary and secondary roughness measurements

| Type of nickel-based collector | Primary roughness Ra1 (μm) | Secondary roughness Ra2 (μm) |
|---|---|---|
| Collector according to the invention (lower roughness) | 1.23 | 0.10 |

Figure 5A:
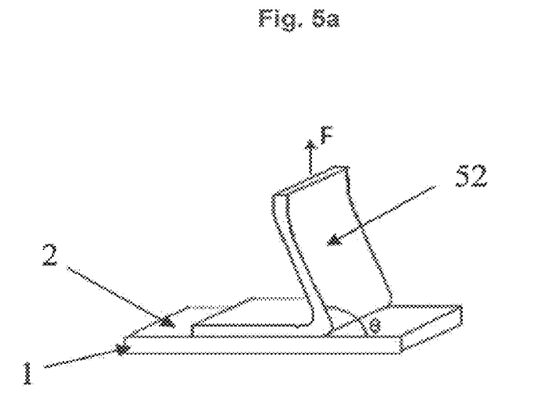
FIG. 5a is a schematic illustration of the test principle.
Figure 5B:
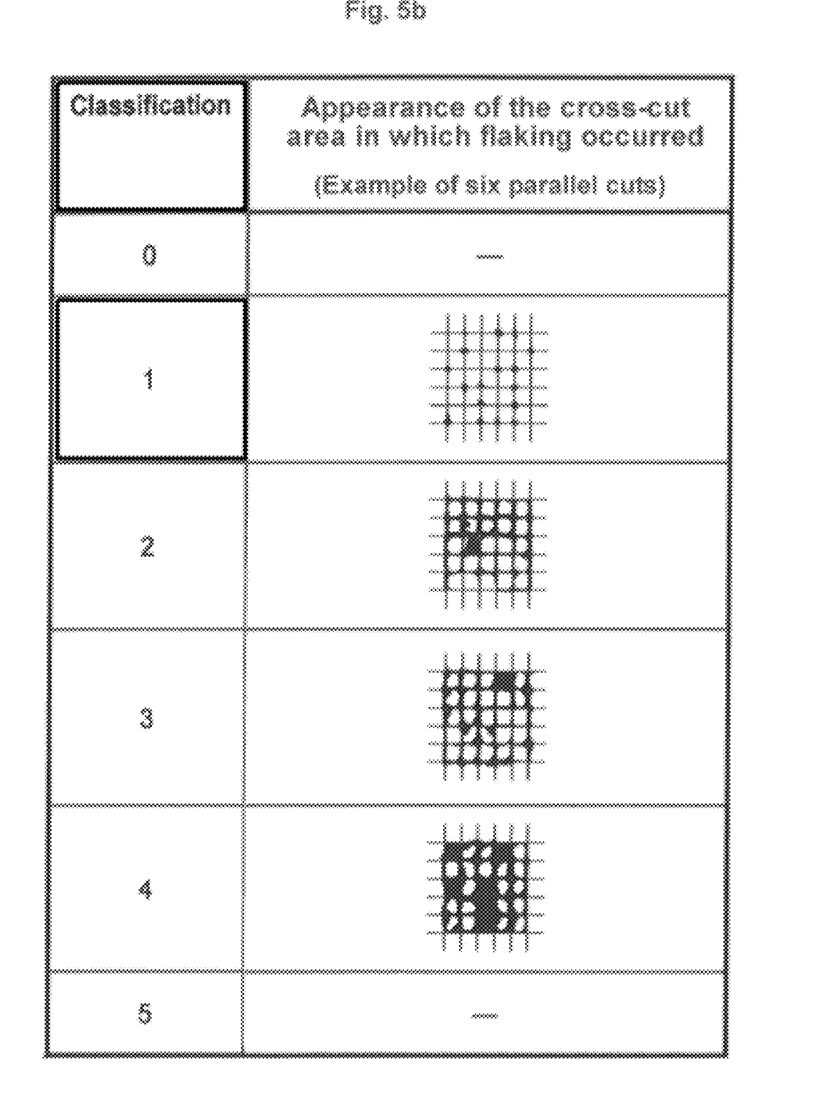
FIG. 5b shows the classification according to standard NF EN ISO 2409 and based on the appearance of the cross-cut portion after the test.

Coating adhesion on each of the three current collectors is evaluated by a mechanical test designated "cross-cut adhesion test" described in standard NF EN ISO 2409 and illustrated by FIG. 5. The measurement principle consists in performing a cross-cut adhesion test of current collector 1 covered with mixture 2 comprising active carbon and binder by making parallel and perpendicular cuts in the coating by means of a multiple-blade cutting tool with guiding and spacing edges. Adhesive tape 52 (type: Tesa N4575) is then applied parallel to the cross-cuts to one of the series of cuts. Within five minutes following application of the tape, the latter is removed by grasping the free end and pulling it off in 0.5 s to 1.0 s at a constant rate and at an angle θ which is as close as possible to 60° according to the diagram of FIG. 5a. Adhesion of mixture 2 on the current collector 1 is evaluated on the basis of the surface pulled off with the adhesive tape 52 and according to the classification of FIG. 5b and Table 1. The surface images of the electrodes tested are shown in FIG. 5c wherein the current collector 1 and the mixture 2 comprising the active material and binder of each of the different collectors are observable. It is then clearly apparent that the active material deposited on the so-called smooth current collector is not adherent and is partially pulled off during the cross-cut test. The detailed results of the adhesion measurements are provided in Table 3 below:

TABLE 3

ISO 2409 electrode classification after the cross-cut test

| Type of nickel-based collector | ISO 2409 classification |
|---|---|
| So-called smooth collector | 5 |
| Collector according to the invention (Ra1 = 2.34 μm) | 1 |
| Collector according to the invention (Ra1 = 1.23 μm) | 3 |

Figure 6:
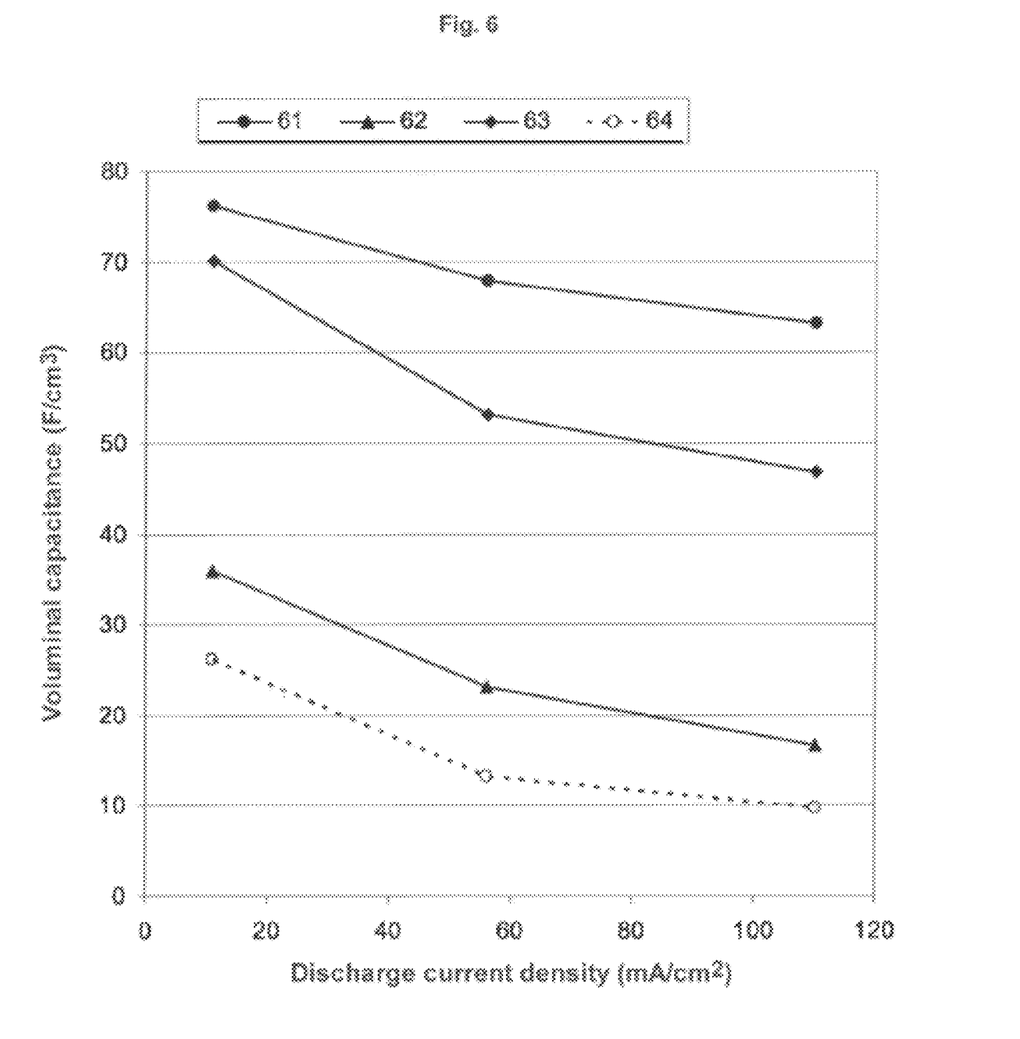
FIG. 6 shows measurement curves of voluminal capacitance (F/cm³) for various electrodes versus the discharge current density (mA/cm²).
Figure 6C:
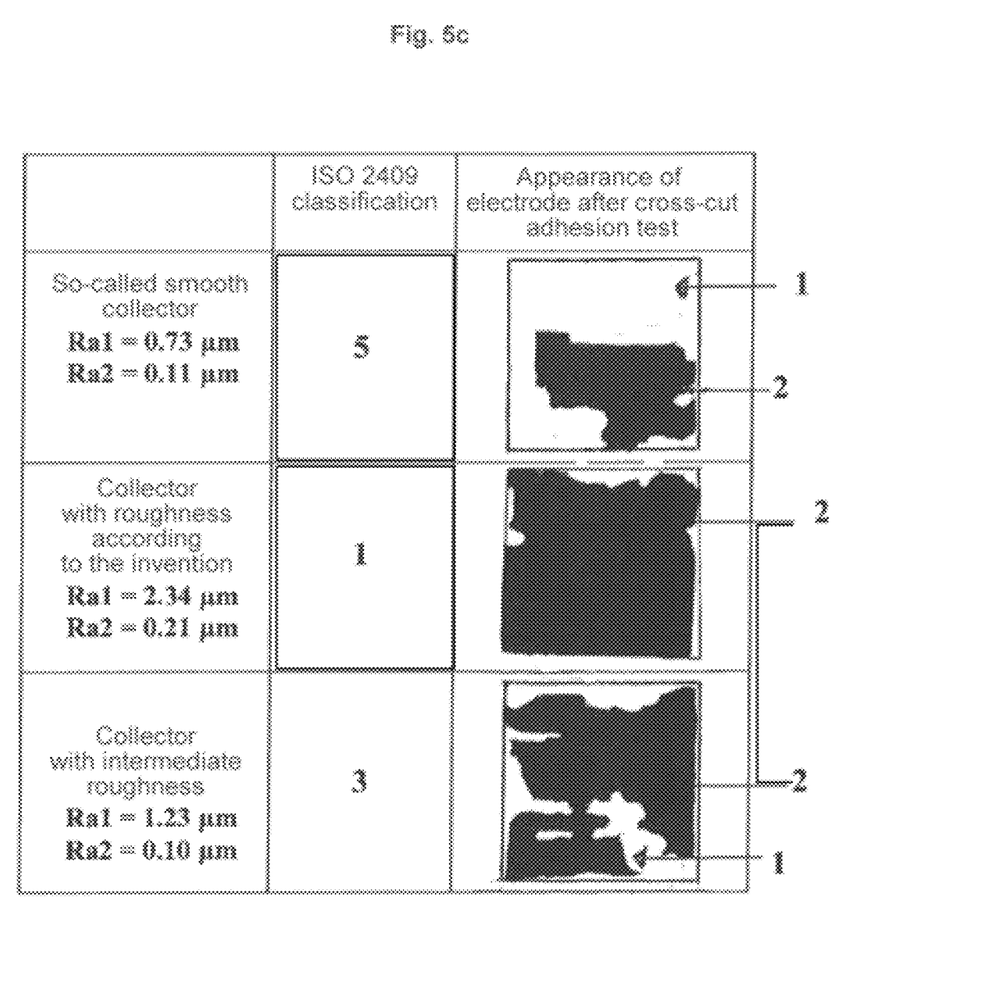
Figure 7:
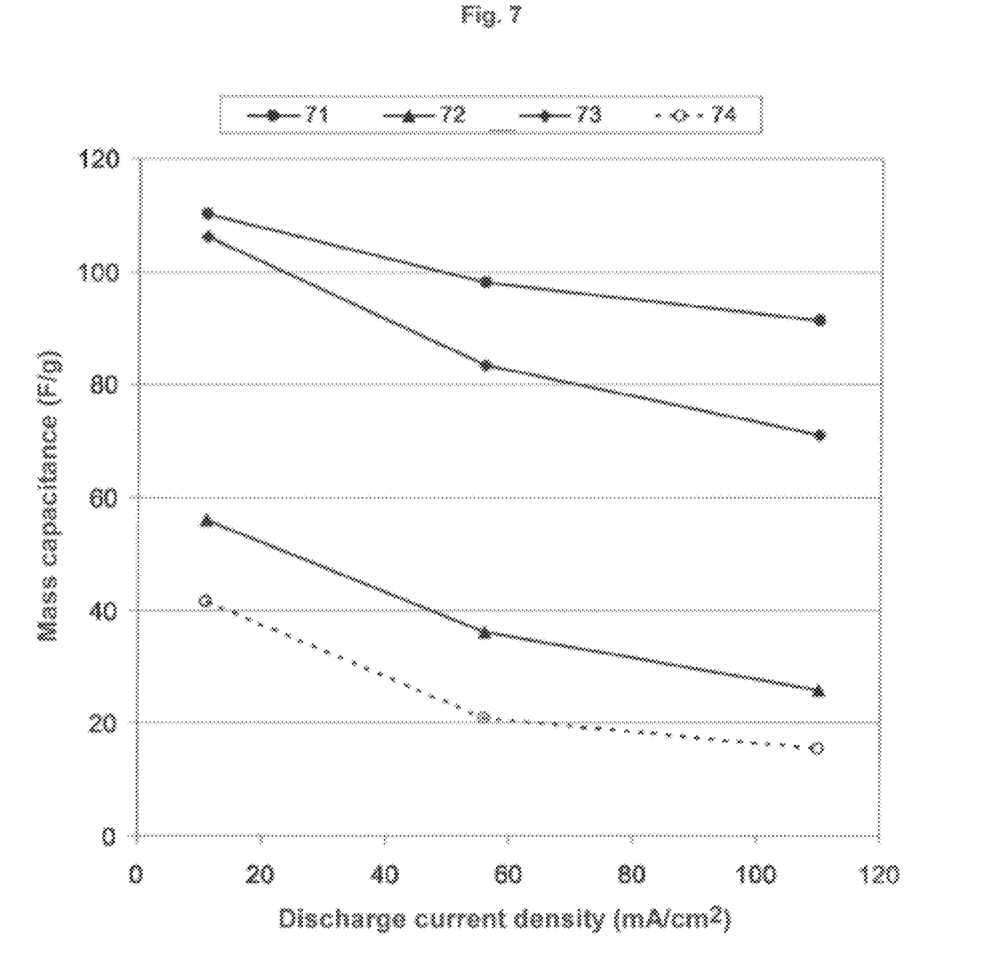
FIG. 7 shows measurement curves of mass capacitance (F/g) for various electrodes versus the discharge current density (mA/cm²).

The voluminal and mass capacitances of various electrodes were measured according to discharge current density. The results are shown in the curves of FIGS. 6 and 7. Curves 61 and 71 were obtained for an electrode having a coating with HPMC and SBR on the current collector according to the invention and exhibiting high roughness (Ra1=2.34 μm). Curves 62 and 72 were obtained for an electrode having a coating with HPMC and SBR on a so-called smooth current collector. Curves 63 and 73 were obtained for an electrode having a coating with HPMC and SBR on a current collector according to the invention and exhibiting lower roughness (Ra1=1.23 μm). Curves 64 and 74 were obtained for an electrode with a PTFE-based coating on a current collector according to the invention and exhibiting high roughness (Ra1=2.34 μm).

With regard to these curves, it becomes clearly apparent that the voluminal and mass capacitances are higher if the polymeric binder for coating the current collector of roughness Ra according to the invention does not contain any PTFE, but rather a mixture of cellulosic compound and styrenic copolymer. Indeed, the voluminal capacitance with a PTFE-based coating does not exceed 28 F/cm$^3$, whereas the voluminal capacitance with a coating according to the invention exceeds 75 F/cm$^3$. The nature of the binder used is important and has an influence on the electrode's performance. By removing the latex from the active material, the electrode capacitances are vastly improved.

FIGS. 6 and 7 also enable comparison of various current collectors coated with the mixture according to the invention. From these curves, it then appears that the so-called smooth current collector exhibits voluminal and mass capacitances which are much smaller than those of collectors with roughness according to the invention. In addition, the curves of FIGS. 6 and 7 show that the electrode with the current collector having the greatest roughness gives better voluminal and mass capacitances than the electrode having the current collector having the lowest roughness. The roughness parameter of the current collector has an important influence and enables substantial improvement in the performances of the electrode containing said current collector.

Of course, the present invention is not limited to the examples and to the preferred embodiments described and illustrated, but is open to numerous alternatives accessible to one skilled in the art.

The invention claimed is:
1. An asymmetric supercapacitor comprising:
a) at least one positive electrode comprising a nickel-based hydroxide and one nickel-based current collector;
b) at least one negative electrode comprising a continuous current collector wherein 50% or more of the surface of said collector exhibits a roughness Ra1 comprised between 0.8 and 15 μm, measured for a base length comprised between 2 and 200 μm, said collector being coated with a mixture comprising:
 i) at least 60% by weight of active carbon having a specific surface area greater than or equal to 500 m$^2$/g;
 ii) a binder comprising a mixture of at least one cellulosic compound and at least one styrenic copolymer;
the negative electrode being obtained by a process comprising the steps of:
 depositing the mixture onto the current collector;
 compressing or calendering the mixture-coated current collector in order to form the electrode;
c) an alkaline electrolyte;
d) at least one separator the negative electrode being charged by a non-Faradic process whereby ion accumulation at the electrolyte/electrode interface forms a double layer where a first layer is made up by accumulation of the electrolyte cations adsorbed at the active carbon surface and a second layer is made up by accumulation of electrons in the active carbon,
wherein the binder of the negative electrode does not contain any polytetrafluoroethylene (PTFE).
2. The asymmetric supercapacitor according to claim 1, wherein the separator comprises a non-woven polypropylene material and.
3. The asymmetric supercapacitor according to claim 1, wherein roughness Ra1 of the current collector of the negative electrode is comprised between 1 and 5 μm.
4. The asymmetric supercapacitor according to claim 1, wherein the current collector of the negative electrode exhibits, on at least 50% of its surface area, a roughness Ra2 comprised between 0.1 and 0.5 μm, measured for a base length greater than or equal to 0.1 μm and strictly less than 2 μm.

5. The asymmetric supercapacitor according to claim 1, wherein 75% or more of the surface area of the current collector of the negative electrode exhibits a roughness Ra1 comprised between 0.8 and 15 μm.

6. The asymmetric supercapacitor according to claim 1, wherein the active carbon in the negative electrode exhibits a specific surface area greater than or equal to 1,000 $m^2/g$.

7. The asymmetric supercapacitor according to claim 1, wherein the mixture of the negative electrode also comprises a carbon compound other than active carbon, selected from the group comprising carbon black, glassy carbon, graphite and petroleum pitch.

8. The asymmetric supercapacitor according to claim 1, wherein the material of the continuous current collector of the negative electrode is selected from nickel or a nickel-based alloy, copper or a copper-based alloy, aluminum or an aluminum-based alloy, stainless steel and nickel steel.

9. The asymmetric supercapacitor according to claim 1, wherein the cellulosic compound in the negative electrode is selected from the group comprising hydroxy-propyl-methylcellulose (HPMC), carboxymethylcellulose (CMC), hydroxypropylcellulose (HPC) and hydroxyethyl cellulose (HEC).

10. The asymmetric supercapacitor according to claim 1, wherein the styrenic copolymer in the negative electrode is a styrenic block copolymer selected from the group comprising styrene-butadiene rubber (SBR), styrene-isoprene (SI), styrene-ethylene/butylene (SEB), styrene-isoprene/butylene (SIB), styrene-ethylene/propylene (SEP), styrene-butadiene-styrene (SBS), styrene-isoprene-styrene (SIS), styrene-ethylene/butylene-styrene (SEBS), styrene-isoprene/butylene styrene (SIBS) and styrene-ethylene/propylene-styrene (SEPS).

11. The asymmetric supercapacitor according to claim 1, wherein the styrenic copolymer in the negative electrode is polystyrene acrylate (PSA).

12. The asymmetric supercapacitor according to claim 1, wherein the binder in the negative electrode consists in a mixture of cellulosic compound(s) and styrenic copolymer(s).

13. The asymmetric supercapacitor according to claim 1, wherein the styrenic copolymer is styrene-butadiene rubber (SBR) and the cellulosic compound is hydroxy-propyl-methylcellulose (HPMC) in the negative electrode.

14. The asymmetric supercapacitor according to claim 1, wherein the mixture of the negative electrode comprises from 60 to 93% by weight of active carbon, from 5 to 20% by weight of carbon black, from 1 to 10% by weight of the cellulosic compound and from 1 to 10% by weight of styrenic copolymer.

15. The asymmetric supercapacitor according to claim 1, wherein, in the negative electrode, a tack coating comprising carbon is present between the current collector and the mixture.

16. An asymmetric supercapacitor comprising:
  a) at least one positive electrode comprising a nickel-based hydroxide and one nickel-based current collector;
  b) at least one negative electrode comprising a continuous current collector wherein 50% or more of the surface of said collector exhibits a roughness Ra1 comprised between 0.8 and 15 μm, measured for a base length comprised between 2 and 200 μm, said collector being coated with a mixture comprising:
    i) at least 60% by weight of active carbon having a specific surface area greater than or equal to 500 $m^2/g$;
    ii) a binder comprising a mixture of at least one cellulosic compound and at least one styrenic copolymer;
  the negative electrode being obtained by a process comprising the steps of:
    depositing the mixture onto the current collector;
    compressing or calendering the mixture-coated current collector in order to form the electrode;
  c) an alkaline electrolyte;
  d) at least one separator
  the negative electrode being charged by a non-Faradic process whereby ion accumulation at the electrolyte/electrode interface forms a double layer where a first layer is made up by accumulation of the electrolyte cations adsorbed at the active carbon surface and a second layer is made up by accumulation of electrons in the active carbon; and
  wherein the styrenic copolymer is styrene-butadiene rubber (SBR) and the cellulosic compound is hydroxy-propyl-methylcellulose (HPMC) is the negative electrode.

* * * * *